United States Patent [19]
Patterson et al.

[11] Patent Number: 5,915,902
[45] Date of Patent: Jun. 29, 1999

[54] UNDEFORMED LOCK NUT WITH SLOT

[75] Inventors: John Patterson, Arlington Heights; Nandan R. Mehta, Schaumburg, both of Ill.

[73] Assignee: Illinois Tool Works Inc., Glenview, Ill.

[21] Appl. No.: 08/934,380

[22] Filed: Sep. 19, 1997

[51] Int. Cl.⁶ .................................................. F16B 39/02
[52] U.S. Cl. ...................... 411/291; 411/277; 411/937.2
[58] Field of Search ................................ 411/290, 291, 411/937.2, 5, 9, 10, 276, 277, 533, 285

[56] References Cited

U.S. PATENT DOCUMENTS

| | | | |
|---|---|---|---|
| 613,777 | 11/1898 | Putman | 411/291 |
| 1,351,676 | 8/1920 | Myers | 411/937.2 |
| 1,449,683 | 3/1923 | Lippold | 411/937.2 |
| 2,142,819 | 1/1939 | Olson . | |
| 2,243,515 | 5/1941 | Van Sant | 411/291 |
| 3,659,491 | 5/1972 | Duffy et al. . | |
| 4,043,369 | 8/1977 | Abernethy | 411/937.2 |
| 4,840,526 | 6/1989 | Bourdonne . | |
| 4,986,712 | 1/1991 | Futz | 411/533 |

FOREIGN PATENT DOCUMENTS

| | | | |
|---|---|---|---|
| 1324589 | 3/1963 | France | 411/291 |
| 2357771 | 2/1978 | France | 411/277 |
| 48583 | 2/1921 | Sweden | 411/291 |
| 7767 | of 1903 | United Kingdom | 411/291 |
| 551534 | 2/1943 | United Kingdom | 411/291 |

OTHER PUBLICATIONS

Philidas Limited, "Locked into Quality" (Turret Self Locking Nuts), pp. 1–5.
U.S. Application No. 08/628,982, Gruca, filed Apr. 8, 1996.
U.S. Application No. 08/628,923, Dziaba, filed Apr. 8, 1996.

*Primary Examiner*—Flemming Saether
*Attorney, Agent, or Firm*—Thomas W. Buckman

[57] ABSTRACT

A lock nut threadably engageable and lockingly retainable about a threaded shaft extending through a workpiece, the lock nut having at least one deformable slot disposed on a side portion thereof and disposed transversely relative to the lock nut bore axis, the lock nut also having a nut deforming member protruding from a bottom end thereof, wherein at least a portion of the nut deforming member is in substantial axial alignment with the deformable slot. The lock nut is undeformed prior to installation thereof about the threaded shaft. The nut deforming member is engageable with the workpiece to deform the lock nut upon threadably installing the lock nut about the threaded shaft, thereby retaining the lock nut thereabout, whereby the lock nut has a relatively consistent torque performance with reduced statistical spread over several installation and removal cycles of the nut about the threaded shaft. The nut deforming member is an annular portion of the skirt disposed peripherally on the bottom end of the lock nut, which may have a substantially countersunk surface. The lock nut may alternatively include a spring washer rotatably coupled thereto.

17 Claims, 3 Drawing Sheets

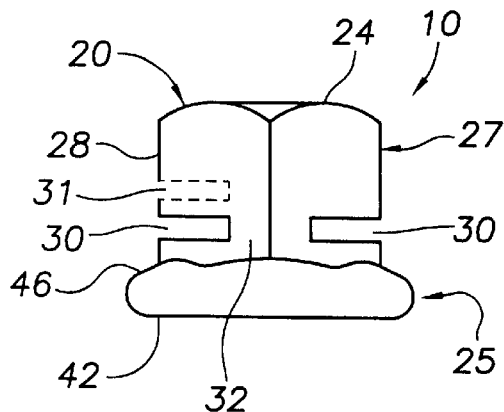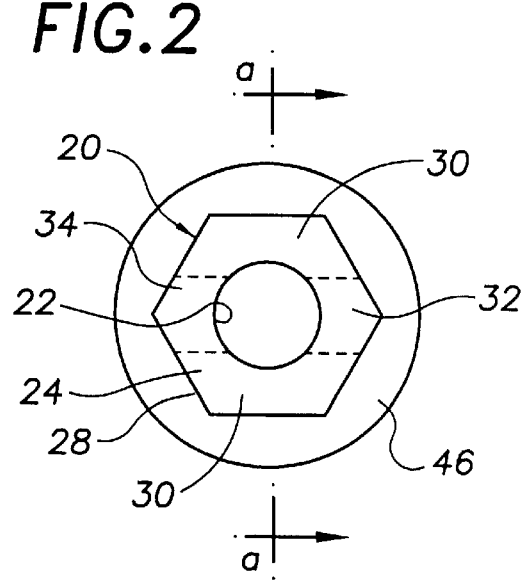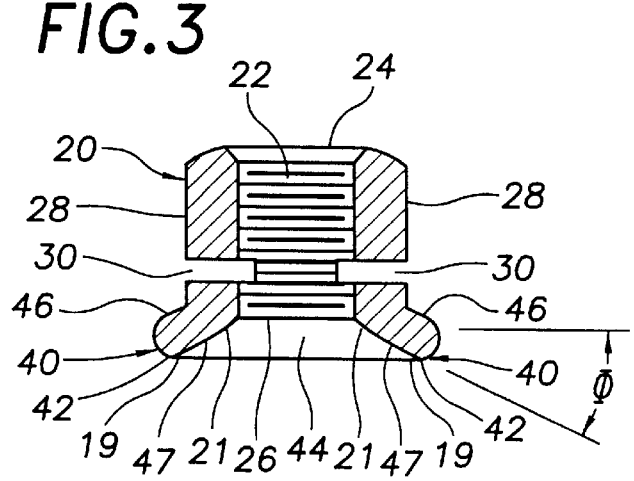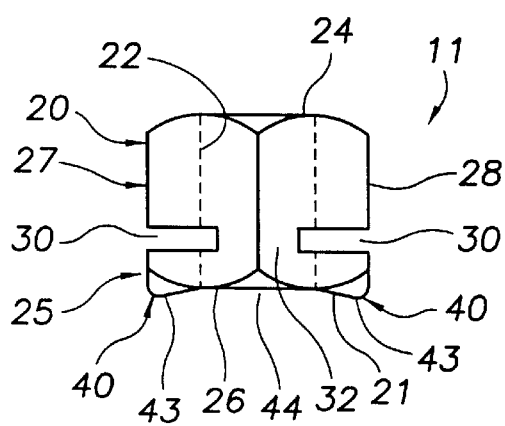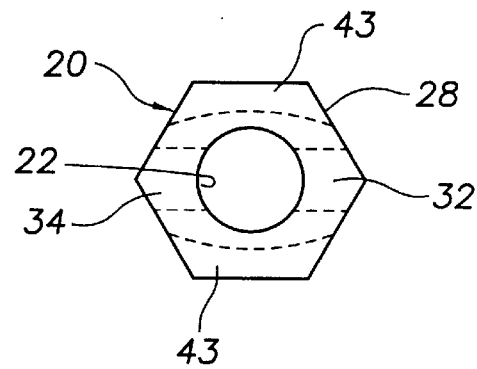

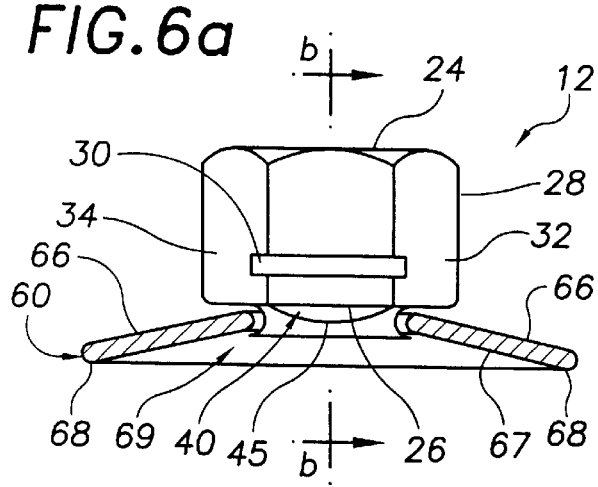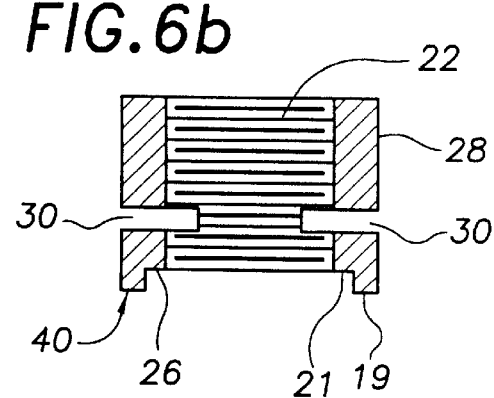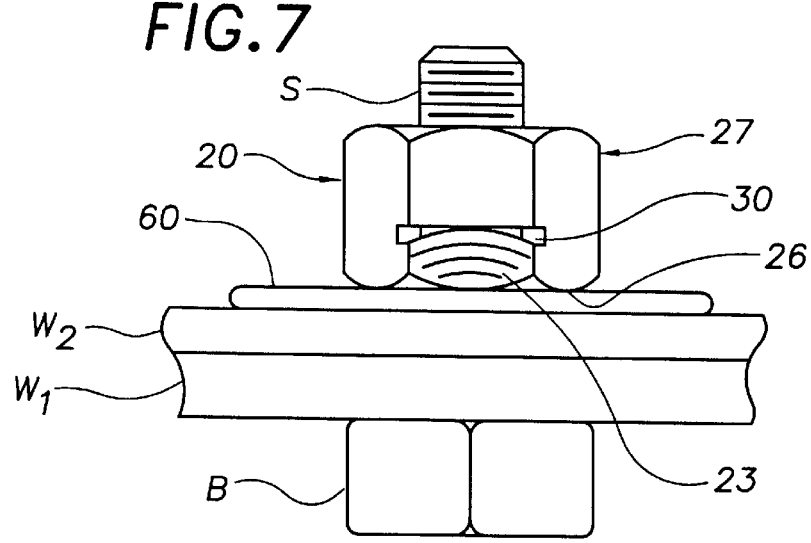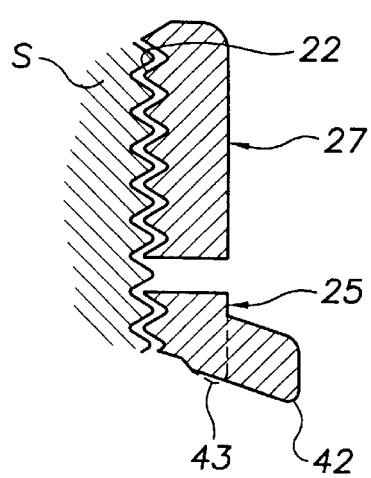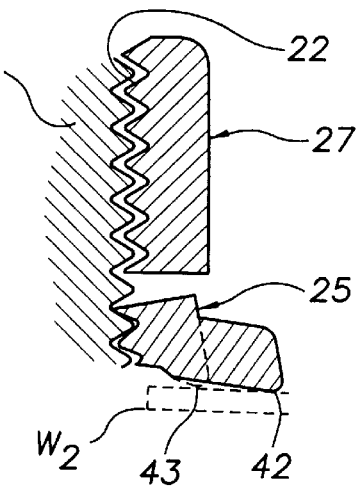

UNDEFORMED LOCK NUT WITH SLOT

CROSS-REFERENCE TO RELATED APPLICATIONS

The present patent application is related to copending U.S. application Ser. No. 08/628,923 entitled "Prevailing Torque Nut" and U.S. application Ser. No. 08/628,982 entitled "Method for Sizing a Lock Nut", both filed on Apr. 8, 1996, both commonly assigned herewith and incorporated by reference herein.

BACKGROUND OF THE INVENTION

The invention relates generally to lock nuts threadably engageable and lockingly retainable about a threaded shaft, and more particularly to lock nuts which are undeformed prior to installation, and lock nuts having improved torque performance, while providing extremely low "first on" torques, including relatively consistent torque performance with reduced statistical spread over several installation and removal cycles.

Lock nuts have many configurations and are used widely in industry.

U.S. Pat. No. 2,142,819 entitled "Self Gripping Device" issued on Jan. 3, 1939 to Olson and commonly assigned herewith, for example, discloses a locking nut having diametrically opposed slots disposed transversely therein to form yieldable sections, which are deflected axially to distort a portion of the threaded bore by helical disalignment thereof along the yieldable sections, prior to installation thereof, thereby providing a balanced frictional grip on a threaded shaft subsequently disposed through the threaded bore of the lock nut.

U.S. Pat. No. 3,659,491 entitled "Rotatable Nut and Washer Assembly" issued on May 2, 1972 to Duffy et al. discloses a lock nut formed of a threaded inner barrel coupled by a web to a hexagonally shaped outer barrel having a radially extending peripheral skirt, which is formed as a unitary nut member. The nut of U.S. Pat. No. 3,659,491 is rotatably coupled to a frusto-conical spring washer, which forms an assembly, wherein the spring washer is flattenable between the nut and a workpiece, to provide a reverse axial tension on the nut and a radially inwardly directed compressive force on the inner barrel, which locks the nut about a threaded shaft. The spring washer in U.S. Pat. No. 3,659,491 becomes rotationally fixed relative to the workpiece, thereby reducing the torque required to install the lock nut about the shaft and thereby also reducing damage to the surface of the workpiece, which otherwise occurs when the washer is rotationally fixed relative to the nut. The lock nut of U.S. Pat. No. 3,659,491 however is relatively expensive to manufacture, particularly the unitary nut portion, which is fabricated from sheet metal.

Generally, prior art lock nut retention performance is diminished substantially upon removal of the nut from the threaded shaft. In lock nuts of the type disclosed in U.S. Pat. No. 2,142,819 discussed above, the diminished retention performance results from a tendency of the slots to widen after the lock nut is disposed about the shaft during the first installation and subsequent first removal therefrom. This adverse effect on prior art lock nut retention performance is particularly significant after the first installation and removal cycle, and continues to worsen as the lock nut is subject to repeated cycles of installation and removal, which commonly occurs in applications where the nut must be removed and reinstalled for service and maintenance.

FIG. 9 of the present patent application illustrates graphically the torque performance of prior lock nuts over several installation and removal cycles generally, and more particularly illustrates the relatively large torque required for the first installation, or first on, in comparison to the substantially reduced torque required for the first removal, or first off, wherein the torque performance continues to diminish, though at a lesser rate, with increasing numbers of on and off cycles. FIG. 9 also illustrates the relatively inconsistent torque performance of prior art lock nuts, particularly over the interval between the "1 ON" through the "3 OFF" whereafter the torque performance is more consistent over the interval between the "3 OFF" and the "5 OFF". FIG. 9 illustrates further the tendency of prior art lock nut torque performance not to comply with an industry established torque specification as it decreases below the SPEC curve somewhere between the "2 OFF" and "3 OFF", which often results from the relatively large statistical spread associated with the torque performance of prior art lock nuts.

The copending U.S. application Ser. No. 08/628,923 entitled "Prevailing Torque Nut" discloses a novel lock nut configuration having relatively consistent torque performance and reduced statistical spread over several repeated cycles of nut installation and nut removal about a threaded shaft, which is a remarkable improvement over prior art lock nuts. The copending U.S. application Ser. No. 08/628,982 entitled "Method for Sizing a Lock Nut" discloses a method of manufacturing a lock nut that includes a step of threading an enlarged sizing tool through a deformed portion of a lock nut threaded bore during the manufacture thereof and prior to actual use of the lock nut, which further improves the torque performance thereof. More particularly, the sized lock nut of U.S. application Ser. No. 08/628,923 has among other advantages a relatively more consistent torque performance over several installation and removal cycles, including a reduced first on torque and reduced statistical spread. The threaded bore portions of these lock nuts however are deformed prior to installation.

The present invention is drawn to improved lock nuts that overcome problems in the prior art, and more particularly to lock nuts having further improvements in torque performance, including greater consistency of torque performance, substantially reduced first on torque, and reduced statistical spread.

It is a more particular object of the present invention to provide a novel lock nut threadably engageable and lockingly retainable about a threaded shaft extending through a workpiece, the lock nut having at least one deformable slot disposed on a side portion thereof and disposed transversely relative to the lock nut bore axis, the lock nut also having a nut deforming member protruding from a bottom end thereof, wherein at least a portion of the nut deforming member is in substantial axial alignment with the deformable slot. Notably, the lock nut is undeformed prior to installation thereof about the threaded shaft. The nut deforming member is however engageable with the workpiece to deform the lock nut upon threadably installing the lock nut about the threaded shaft, thereby retaining the lock nut thereabout, whereby the lock nut has a relatively consistent torque performance with reduced statistical spread over several installation and removal cycles of the nut about the threaded shaft.

It is also an object of the invention to provide a novel lock nut of the more particular configuration described above, wherein the lower portion of the lock nut includes a skirt extending outwardly beyond the side portion thereof, and wherein the nut deforming member is an annular portion of the skirt disposed peripherally on the lower end thereof, wherein a bottom portion of the lock nut has a substantially concaved or countersunk surface.

It is another object of the invention to provide a novel lock nut of the more particular configurations described above, wherein the lock nut includes a plurality of at least two deformable slots disposed on side portions thereof and a corresponding plurality of nut deforming members disposed on the bottom end of the body member in substantial axial alignment with the corresponding deformable slot. In one embodiment, the deformable slots are disposed substantially transversely to the bore axis and substantially symmetrically thereabout, and in another embodiment one or more of the plurality of deformable slots is offset axially along the bore axis relative to the other deformable slots.

It is a further object of the invention to provide a novel lock nut of the more particular configurations described above, wherein the lock nut includes a substantially conical spring washer rotatably coupled to the lower portion of the body member. A sloping upper surface of the spring washer slopes away from the bottom end of the body member and accommodates the one or more nut deforming members therebetween, whereby the nut deforming members are engageable with the upper surface of the spring washer to deform the body member upon clamping and flattening the spring washer between the bottom end of the body member and a workpiece.

These and other objects, features and advantages of the present invention will become more fully apparent upon careful consideration of the following Detailed Description of the Invention and the accompanying Drawings, which may be disproportionate for ease of understanding, wherein like structure and steps are referenced by corresponding numerals and indicators.

BRIEF DESCRIPTION OF THE DRAWINGS

FIG. 1 is a side elevational view of a lock nut according to a first exemplary embodiment of the invention.

FIG. 2 is a top plan view of the lock nut of FIG. 1.

FIG. 3 is a sectional view along lines a—a of FIG. 2.

FIG. 4 is a side elevational view of a lock nut according to a second exemplary embodiment of the invention.

FIG. 5 is a top plan view of the lock nut of FIG. 4.

FIG. 6 a is a partial sectional side elevational view of a lock nut according to a third exemplary embodiment of the invention.

FIG. 6b is a partial sectional view along lines b—b of FIG. 6a.

FIG. 7 is a side elevational view of a lock nut according to the present invention disposed about a threaded bolt shaft for clamping together first and second workpieces.

FIG. 8a is a partial sectional view of a lock nut according to the present invention prior to installation.

FIG. 8b is partial sectional view of the lock nut of FIG. 8a after installation.

DETAILED DESCRIPTION OF THE INVENTION

Figure 9:
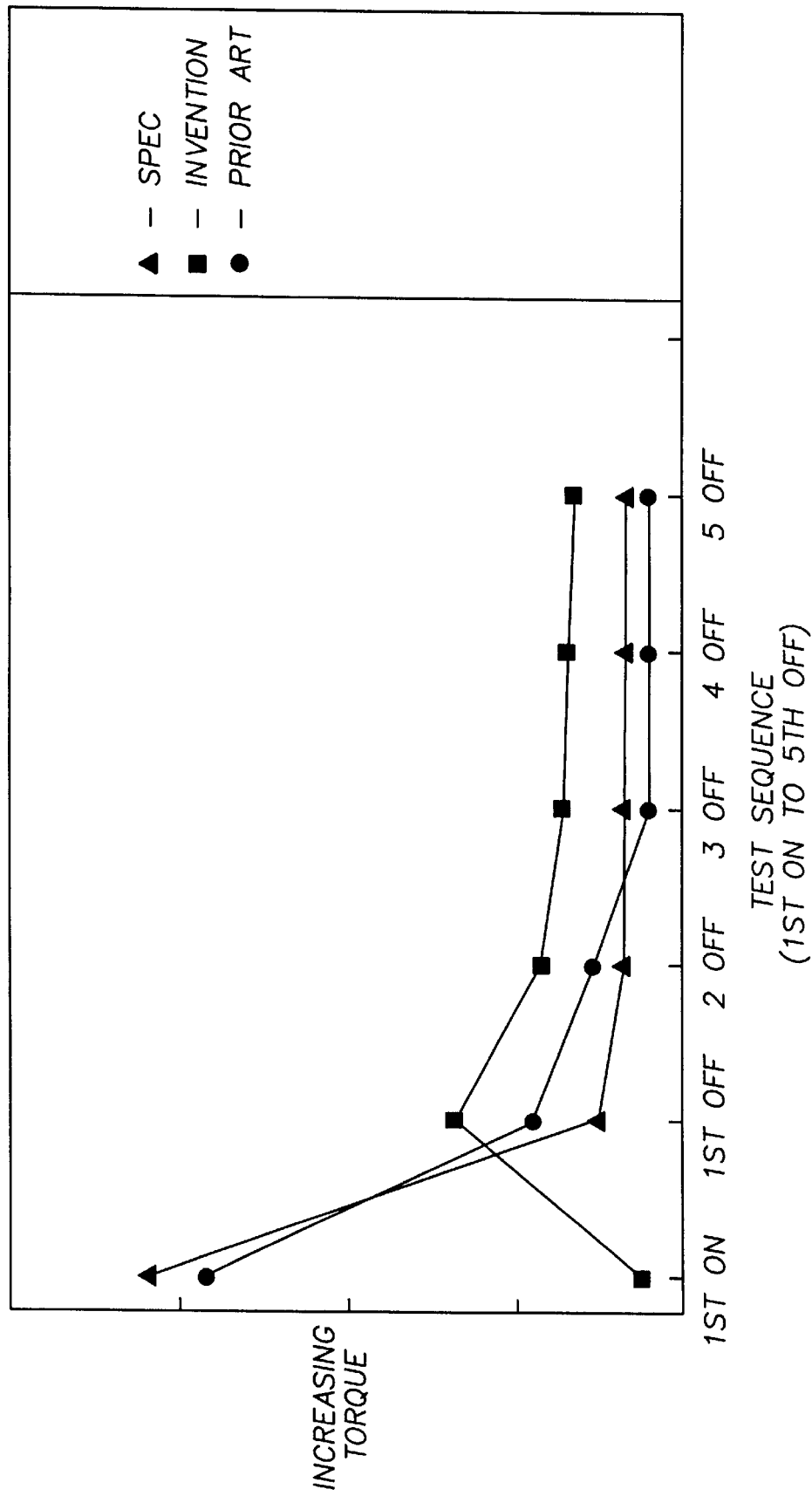
FIG. 9 is a comparative graphical illustration of the torque performance of a lock nut according to the present invention and a prior art lock nut.

FIGS. 1–3 illustrate various views of a lock nut 10 according to a first exemplary embodiment of the invention comprising generally a body member 20 having a threaded bore 22 along a bore axis for receiving a threaded shaft, a top end 24, a bottom end 26, and a circumferential side portion 28. The side portion 28 of the body member 20 typically has a hexagonal surface or other partially closed surface configuration to facilitate engagement thereabout with a torque applying or wrenching tool, as is known generally. The lock nut is preferably formed unitarily of a ductile and resilient metal material, like low carbon steel or stainless steel, and may be plated and or heat treated.

FIGS. 1–3 illustrate at least one deformable slot 30 disposed on the side portion 28 of the body member 20 and extending into the threaded bore 22, and in other embodiments the slot 30 extends only partially through the body member toward the threaded bore 22. In the exemplary embodiment, two deformable slots 30 are disposed on opposing side portions of the body member 20 thereby defining posts 32 and 34 at corner sections of the hexagonal wrenching surfaces interconnecting a lower portion 25 and an upper portion 27 of the body member 20, wherein each deformable slot 30 is disposed substantially transversely relative to the bore axis.

More generally, the body member 20 may include a plurality of deformable slots 30 extending toward or into the bore axis, thereby forming a corresponding plurality of posts. Disposing the slots substantially transversely to the bore axis and substantially symmetrically thereabout provides balanced retention of the lock nut 10 about the shaft. In the exemplary embodiment, the plurality of deformable slots 30 are disposed along a common plane disposed substantially transversely relative to the bore axis, and in other alternative embodiments one or more of the plurality of deformable slots 30 may be offset from each other along the bore axis, as shown by the phantom line slot 31 in FIG. 1.

FIGS. 1–3, and particularly FIG. 3, illustrate the nut deforming members 40 protruding from the bottom end 26 of the body member 20, wherein the nut deforming members 40 are each aligned axially with a corresponding deformable slot 30. In the preferred of embodiment of FIGS. 1–3, the nut deforming members 40 have sections extending radially outwardly from the slots 30 also. According to this aspect of the invention, the nut deforming members 40 are depressible axially toward the corresponding deformable slot 30 to deform the body member 20 by deformably urging portions of the lower portion 25 thereof into the deformable slots 30 upon installation of the lock nut as discussed further below.

In FIGS. 1–3, the nut deforming members 40 are formed by an annular or substantially annular portion 42 disposed peripherally about the bottom end 26 of the body member 20, wherein the annular portion 42 and the bottom end 26 form a recess or depression 44 on the bottom end 26 of the lock nut. Portions of the annular portion 42 aligned substantially axially with corresponding slots 30 deform the body member 20 upon installation of the lock nut as discussed further below. Notably, the lock nut and more particularly the threaded bore 22 is undeformed prior to installation, which reduces manufacturing costs and greatly reduces the first installation torque, thereby providing remarkably more consistently low start torques.

Referring to FIG. 3, the nut deforming members 40 of this invention may be described more generally as radial outer portions 19 extending axially beyond the radial innermost portions 21 of the bottom end 26 of the body member 20 adjacent the threaded bore 22. This permits the radial outer portions 19 of the lower portion 25 of the body member 20 to be forced upwardly relative to the radial innermost portions 21. Additionally, the nut deforming members 40 are not necessarily annular as shown in FIGS. 1–3. In other embodiments, the nut deforming members 40 are, for example, partially annular as shown in FIGS. 4 and 5 and discussed further below. The nut deforming member 40, however, may more generally be any member protruding from the bottom end 26 of the body member 20 useable in combination with a corresponding slot 30 for deforming the threaded bore 22 as discussed below.

FIGS. 1–3 also illustrate the lower portion 25 of the body member 20 having a skirt 46 extending substantially radially outwardly beyond the side portion 28 thereof. The skirt 46 includes a lower surface 47 extending slopingly away from the bottom end 26 of the body member 30 at an angle Φ relative thereto, wherein the annular portion 42 is formed peripherally on a terminating bottom end of the skirt 46. The skirt 46 and the bottom end 26 thus form the depression 44 having a substantially concaved surface, but which may alternatively have an arcuate shape, or frusto-conical shape, or a combination of arcuate and frusto-conical shapes.

Table I below provides approximate exemplary dimensional ranges for several parameters of the lock nut disclosed in FIGS. 1–3, wherein S is the height of the slot 30 along the bore axis, P is the width of the posts 32 and 34 transverse to the bore axis, D is the height of the body member 20 along the bore axis, F is the height of the lower portion 25 of the body member 20 along the bore axis, and H is the overall height of the lock nut along the bore axis. The angle Φ for these exemplary dimensions is between approximately 10 degrees and approximately 20 degrees.

TABLE I (METRIC Dimensions in Millimeters)

| Size | S | P | $D_{MIN}$ | F | H |
|---|---|---|---|---|---|
| M12 (6H Thread) | 0.070/0.060 | 0.265/.255 | 0.404 | 0.225/0.215 | 0.670/0.660 |

FIGS. 4 and 5 illustrate various views of a lock nut 11 according to a second exemplary embodiment of the invention also comprising generally a body member 20 having a threaded bore 22 along a bore axis for receiving a threaded shaft, a top end 24, a bottom end 26, and a circumferential side portion 28 configured to facilitate engagement thereabout with a torque applying or wrenching tool, as discussed above. The lock nut 11 of FIGS. 4 and 5 is also preferably formed unitarily as discussed above with reference to the embodiments of FIGS. 1–3.

FIGS. 4 and 5 illustrate two deformable slots 30 disposed on side portions of the body member 20 and extending into, or at least partially toward, the threaded bore 22. The deformable slots 30, which may be offset axially, are disposed on substantially opposing side portions of the body member 20 thereby defining posts 32 and 34 at corner sections of the hexagonal wrenching surfaces interconnecting a lower portion 25 and an upper portion 27 of the body member 20, wherein each deformable slot 30 is disposed substantially transversely to the bore axis. The deformable slots 30 in the second embodiment of FIGS. 4 and 5 may be configured alternatively as discussed above.

FIGS. 4 and 5 also illustrate nut deforming members 40 protruding from the bottom end 26 of the body member 20, wherein each nut deforming member 40 is aligned substantially axially with a corresponding deformable slot 30. The nut deforming members 40 are depressible axially toward the corresponding deformable slot 30 to deform the body member 20 by deformably urging portions of the lower portion 25 thereof into the deformable slots 30 upon installation of the lock nut as discussed further below.

In FIGS. 4 and 5, the nut deforming members 40 are partially annular portions 43 disposed peripherally on the bottom end 26 of the body member 20, wherein the partially annular portions 43 and the bottom end 26 also form a recess or depression 44 on the bottom end 26 of the lock nut. The partially annular portions 43 are aligned substantially axially with a corresponding slot 30, for subsequently deforming the body member 20. Notably, the body member 20 and more particularly the threaded bore 22 is undeformed prior to installation, which reduces manufacturing costs and greatly reduces the first installation torque, thereby providing remarkably more consistently low start torques.

FIGS. 6a and 6b illustrate various views of a lock nut 12 according to a third exemplary embodiment of the invention comprising generally a body member 20 with slots 30 and corresponding substantially axially aligned nut deforming members 40 formed as cams 45 having a curved lower surface, which may be configured as linear members or as partially annular members 43 similar to the second exemplary embodiment of FIGS. 4 and 5. FIG. 6b also illustrates the nut deforming members 40 as radial outer portions 19 extending axially beyond the radial innermost portions 21 of the bottom end 26 of the body member 20 adjacent the threaded bore 22, as discussed above. Notably, the body member 20 and more particularly the threaded bore 22 thereof is undeformed prior to installation, which reduces manufacturing costs and greatly reduces the first installation torque, thereby providing remarkably more consistently low start torques.

FIG. 6a also illustrates a washer 60 rotatably coupled to the lower portion 25 of the body member 20 in manner typical of such nut and washer assemblies. The washer 60 of FIG. 6a is a substantially conical spring washer having an upper surface 66, which slopes away from the bottom end 26 of the body member 20 and accommodates the one or more nut deforming members 40 protruding from the bottom end 26 thereof prior to installation of the lock nut 10. The spring washer 60 also includes a terminating end with an annular portion 68 disposed peripherally thereon, and a substantially conically sloping lower surface 67, which forms a substantially concaved lower surface 69 with the lower portion 25 of the body member.

FIG. 7 illustrates a previously undeformed lock nut of the present invention generally threadably disposed about a threaded shaft S extending through two adjacently positioned workpieces $W_1$ and $W_2$ wherein the lower portion 25, and more particularly the nut deforming member or members 40, are facing toward and are engageable with the workpiece $W_2$ to deform the lock nut upon installation thereof. The threaded shaft S may be part of a bolt B disposed through both workpieces $W_1$ and $W_2$, or the threaded shaft S may alternatively be a threaded stud member formed integrally with the workpiece $W_1$ and extending through the second workpiece $W_2$, wherein the shaft S and lock nut retain or fasten the workpieces $W_1$ and $W_2$ together.

FIG. 8a illustrates that the lock nuts of this invention and especially the threaded bore 22 thereof is undeformed prior to complete installation, and more particularly prior to engagement of the nut deforming member or members 40 with the workpiece. According to this aspect of the invention, the installation torque is minimal until the nut deforming member or members 40 engage, directly or indirectly, the workpiece and begin to urge or deflect the lower portion 25 of the body member 20 upwardly toward the upper portion 27 thereof to deformably close the slots 30. The novel lock nuts of the present invention thus have a greatly reduced initial installation torque in comparison to lock nuts of the prior art.

In FIG. 7, the lock nut is installed fully, wherein the nut deforming members 40 have been urged upwardly toward the upper portion 27 of the body member 20, and more particularly into a corresponding deformable slot 30, which is at least partially closed by a deformed portion 23 of the body member 20. Although the particular lock nut embodiment of FIG. 7 may be more representative of the lock nut in the exemplary embodiment of FIGS. 4 and 5 in combination with a washer member or the lock nut in the exemplary embodiment of FIG. 6, the at least partially closed deformable slot 30 and the deformed portion 23 of the body member 20 are representative generally of the various exemplary embodiments disclosed herein after installation.

In operation, generally, an initially undeformed lock nut of this invention is advanced along the threaded shaft S toward and into contact with the workpiece $W_2$ by application of a torque either directly to the wrenching surface of the lock nut or to a head portion of the bolt B, until the one or more nut deforming members 40 protruding from the bottom end 26 of the body member 20 engage the workpiece $W_2$, either directly or indirectly depending on the particular configuration thereof. Generally, the one or more slots 30 are deformably closed, at least partially, thereby deforming the cross-section of the threaded bore 22 from a substantially constant pitch and circular shape to a deformed out of phase pitch with an elliptical shape. FIG. 8b illustrates the deformation of the body member and more particularly the lower portion 25 thereof resulting in a compressive force directed generally radially inwardly toward the threaded shaft S. FIG. 8b illustrates further that the upwardly deflected lower portion 25 of the body member 20 also deforms the helical uniformity along at least an axial portion of the threaded bore 22 of the body member 20, particularly toward the lower portion 25 thereof, which results from increased spacing between some threads and decreased spacing between others.

In the exemplary embodiment of FIGS. 1–3, the skirt 46 and more particularly portions of the annular portion 42 thereof protruding from the lower portion 26 of the body member are deflected upwardly toward the upper portion 27 thereof and into the corresponding deformable slots 30 upon engagement of the skirt 46 with the workpiece $W_2$, thereby deforming the body member 20 generally, especially the lower portion 25 thereof as discussed above. More particularly, FIG. 8b illustrates a portion of the upwardly deflected annular portion 42 applying compressive forces directed radially inwardly toward the threaded shaft S deforming the helical uniformity and cross-sectional shape of the threaded bore 22 thereby generally increasing the prevailing torque on the lock nut, which retains the lock nut about the threaded shaft. Other peripheral portions of the skirt 46 are deflected upwardly about the side portion 28 of the body member 20, since the posts 32 and 34 are relatively unyielding to axially compressive forces, thereby also contributing generally to deformation of the body member 20 and thus to retention of the lock nut about the threaded shaft S.

In the exemplary embodiments of FIGS. 4 and 5, the partially annular portions 43 protruding from the lower portion 25 of the body member 20 are deflected upwardly toward the upper portion 27 thereof and into corresponding deformable slots 30 upon engagement of the partially annular portions 43 with the workpiece $W_2$, thereby deforming the body member 20 generally, especially the lower portion 25 thereof as discussed above. More particularly, FIG. 8b illustrates, in phantom, one of the upwardly deflected partially annular portions 43 applying compressive forces directed radially inwardly toward the threaded shaft S deforming the helical uniformity and cross-sectional shape of the threaded bore 22 thereby generally increasing the prevailing torque on the lock nut, which retains the lock nut about the threaded shaft.

In the exemplary embodiments of FIGS. 6a and 6b, the nut deforming members 40 protruding from the lower portion 25 of the body member 20 are deflected upwardly toward the upper portion 27 of the body member 20 and into the deformable slots 30 upon clamping engagement of the spring washer 60 between the nut deforming members 40 and the workpiece $W_2$, thereby deforming the body member 20 generally, especially the lower portion 25 thereof as discussed above. More particularly, FIG. 7 illustrates that as the clamped spring washer 60 begins to flatten, the downwardly sloping upper surface 66 thereof is deflected upwardly toward the lower portion 25 of the body member 20, wherein one or more portions of the upper surface 66 thereof engage corresponding cams 45 disposed protrudingly from the bottom end 26 of the body member 20 thereby deformably closing, at least partially, corresponding deformable slots 30. The upwardly deflected cams 45 apply compressive forces directed radially inwardly toward the threaded shaft S deforming the helical uniformity and cross-sectional shape of the threaded bore 22 thereby generally increasing the prevailing torque on the lock nut, which retains the lock nut about the threaded shaft, similar to the nut deforming members illustrated in FIG. 8b.

The lock nuts shown in the exemplary embodiments of FIGS. 1–8 have remarkably improved torque performance in comparison to prior art lock nuts. FIG. 9 illustrates, more particularly, that the lock nuts of the present invention have generally a substantially reduced installation, or first on torque, in comparison to prior art lock nuts, which results in part from the fact that the lock nuts of the present invention are not deformed until they are first installed, which is true of all embodiments disclosed herein. Thus a significant installation torque is not required, at least initially, to overcome frictional forces resulting from lock nut deformation, as in the prior art, since the lock nuts of the present invention are not deformed until after engagement with the workpiece. FIG. 9 also illustrates that the novel lock nuts of the present invention have a relatively consistent torque performance over several installation and removal cycles, in comparison to prior art lock nuts, which is another remarkable characteristic of the present invention. The lock nuts of the present invention are thus more likely to exceed industry performance specifications.

The torque performance of the novel lock nuts of the present invention also have a relatively reduced statistical spread over several installation and removal cycles, which is yet another remarkable characteristic of the present invention. Reduced statistical spread of torque performance is a very important manufacturing and applications consideration, since it results in the rejection of fewer parts for failure to comply with industry performance specifications for a particular application, and decreases the probability that a lock nut not in compliance with a required specification will be used in a particular application.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A self-deforming lock nut threadably engageable and retainable about a threaded shaft extending through a workpiece, the lock nut comprising:

a body member having a threaded bore along a bore axis for receiving the threaded shaft, the body member having a top end, a bottom end, and a side portion having at least one flat surface thereon;

a deformable slot disposed on the side portion of the body member and extending into the body member toward the threaded bore, the deformable slot disposed substantially transversely to the bore axis;

a nut deforming member protruding axially from the bottom end of the body member, at least a portion of the nut deforming member extending outwardly beyond the side portion of the body member, the threaded bore undeformed prior to installation of the lock nut about the threaded shaft, the nut deforming member protruding from the bottom end of the body member engageable with the workpiece to deform a lower portion of the body member and a lower portion of the threaded bore upon threadably installing the lock nut about the threaded shaft.

2. The lock nut of claim 1, the nut deforming member is an at least partially annular portion disposed peripherally on the bottom end of the body member.

3. The lock nut of claim 1, a lower portion of the body member having a skirt extending outwardly beyond the side portion of the body member, the skirt having a sloping lower surface extending from the bottom end of the body member, the nut deforming member disposed peripherally on a bottom end of the skirt, wherein the skirt and the bottom end form a depression on the lower portion of the body member.

4. The lock nut of claim 1, the nut deforming member is a cam protruding from the bottom end of the nut.

5. The lock nut of claim 4 further comprising a washer rotatably coupled to the lower portion of the body member.

6. The lock nut of claim 1, the deformable slot extending through the side portion of the body member and into the threaded bore.

7. The lock nut of claim 1, the nut deforming member is a substantially annular portion disposed about the threaded bore, and extending outwardly beyond the side portion of the body member.

8. The lock nut of claim 7, the body member having a plurality of at least two deformable slots disposed on the side portion of the body member, each deformable slot disposed substantially transversely to the bore axis, the plurality of deformable slots disposed substantially symmetrically about the bore axis.

9. The lock nut of claim 8, at least one of the plurality of deformable slots is offset axially along the bore axis relative to the other deformable slots.

10. The lock nut of claim 1, the deformable slot spaced axially from the bottom end of the body member not more than approximately three pitches of screw thread.

11. A self-deforming lock nut threadably engageable and retainable about a threaded shaft extending through a workpiece, the lock nut comprising:

a body member having a threaded bore along a bore axis for receiving the threaded shaft, the body member having a top end, a bottom end, and a side portion having at one flat surface thereon;

a deformable slot disposed on the side portion of the body member and extending into the body member toward the threaded bore, the deformable slot disposed substantially transversely to the bore axis;

a lower portion of the body member having a skirt with a bottom end extending outwardly beyond the side portion of the body member;

a nut deforming member protruding axially from the bottom end of the skirt, the nut deforming member is a substantially annular portion disposed about the threaded bore, at least a portion of the nut deforming member located outwardly of the side portion of the body member, the threaded bore undeformed prior to installation of the lock nut about the threaded shaft, the nut deforming member protruding from the bottom end of the body member engageable with the workpiece to deform a lower portion of the body member and a lower portion of the threaded bore upon threadably installing the lock nut about the threaded shaft.

12. The lock nut of claim 11, the deformable slot spaced axially from the bottom end of the body member not more than approximately three pitches of screw thread.

13. The lock nut of claim 11, the body member having a plurality of at least two deformable slots disposed on the side portion of the body member, each deformable slot disposed substantially transversely to the bore axis, the plurality of deformable slots disposed substantially symmetrically about the bore axis.

14. The lock nut of claim 13, at least one of the plurality of deformable slots offset axially along the bore axis relative to the other deformable slots.

15. The lock nut of claim 11, the deformable slot extending through the side portion of the body member and into the threaded bore.

16. A lock nut threadably engageable and retainable about a threaded shaft extending through a workpiece, the lock nut comprising:

a body member having a threaded bore along a bore axis for receiving the threaded shaft, the body member having a top end, a bottom end, and a side portion;

a plurality of at least two deformable slots disposed on the side portion of the body member and extending into the body member toward the threaded bore, each deformable slot disposed substantially transversely to the bore axis;

a plurality of nut deforming members corresponding to the plurality of deformable slots, each nut deforming member protruding from the bottom end of the body member and aligned substantially with a corresponding deformable slot, at least a portion of the plurality of nut deforming members extending outwardly beyond the side portion of the body member, the threaded bore undeformed prior to installation of the lock nut about the threaded shaft, and the nut deforming member protruding from the bottom end of the body member engageable with the workpiece to deform a lower portion of the body member and a lower portion of the threaded bore upon threadably installing the lock nut about the threaded shaft.

17. The lock nut of claim 16, the plurality of deformable slots disposed substantially symmetrically about the bore axis.

* * * * *